Aug. 17, 1943.  R. W. SCOTT  2,327,135
FREIGHT TRANSFER MECHANISM
Filed Nov. 4, 1941  3 Sheets-Sheet 3
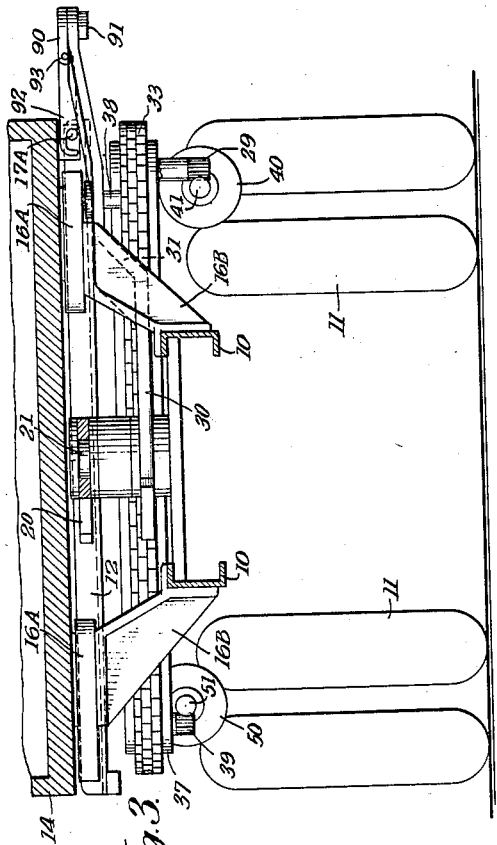
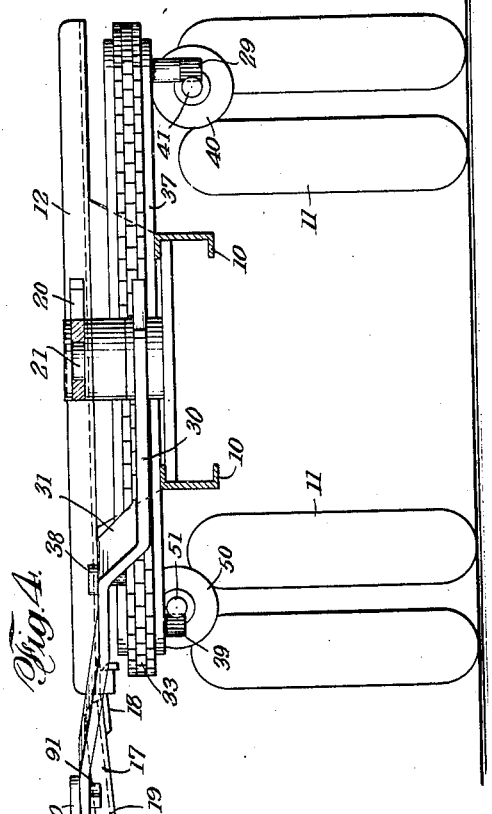
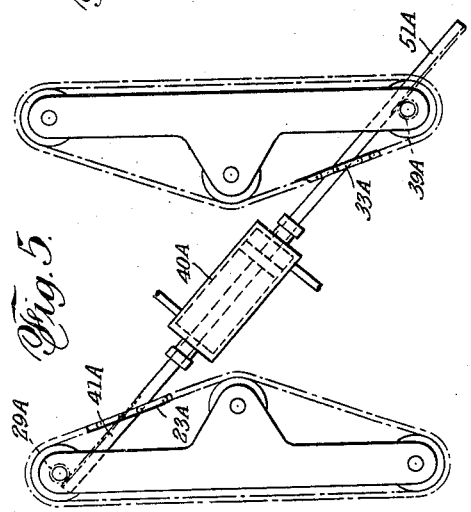
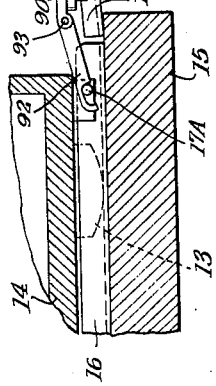
INVENTOR
RUMSEY W. SCOTT
BY
Marshall & Hawley
ATTORNEYS Patented Aug. 17, 1943

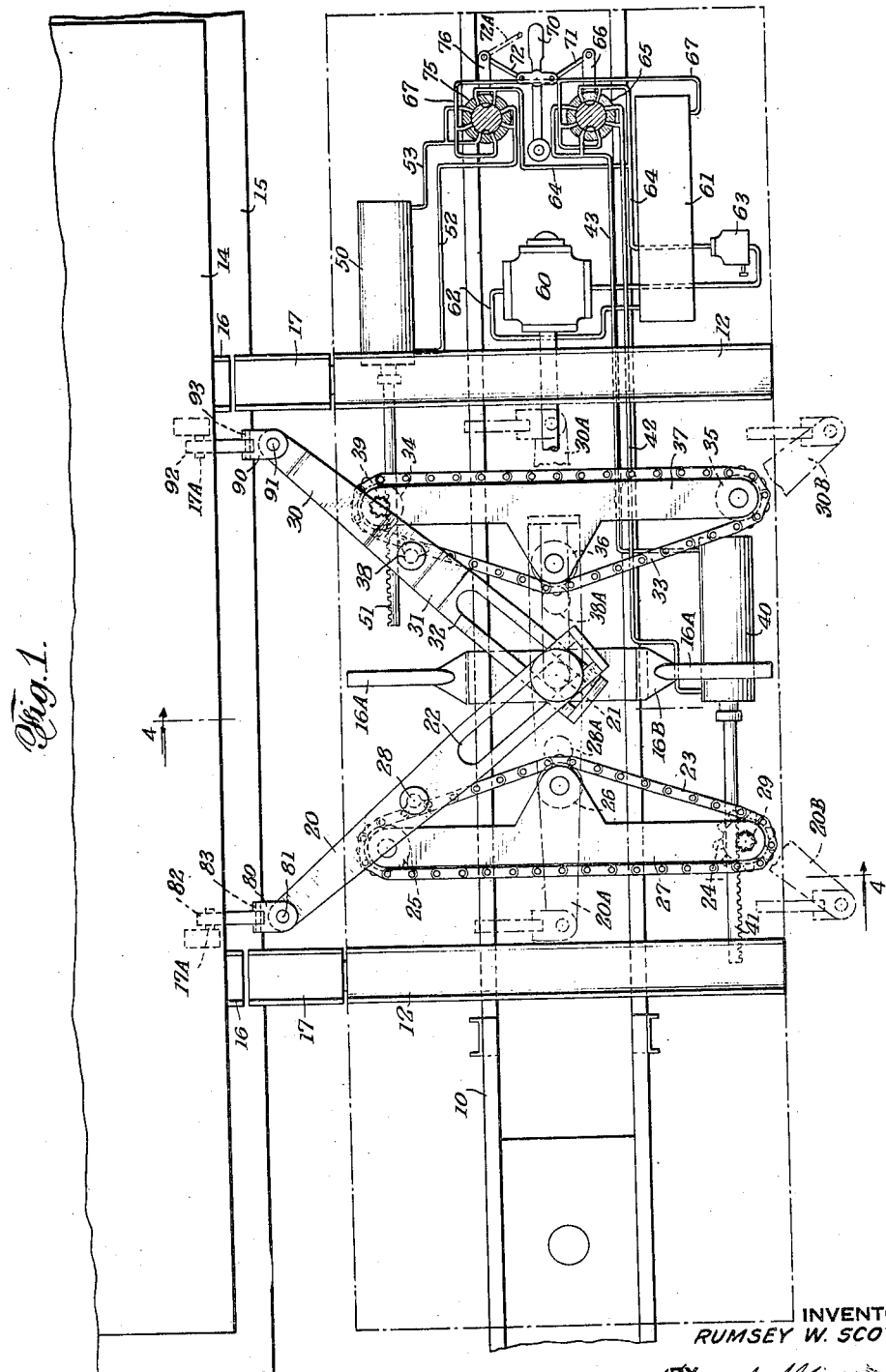

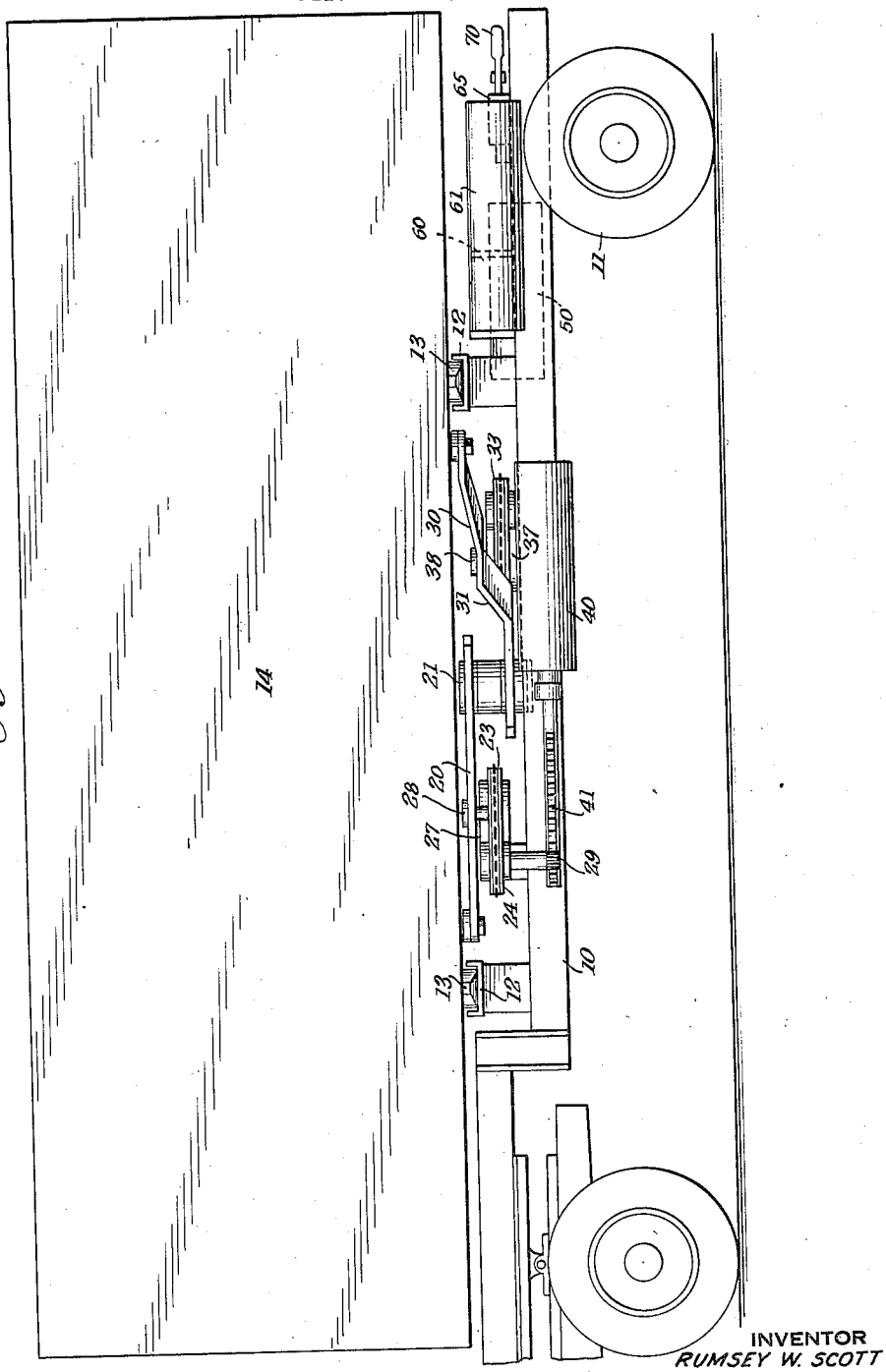

2,327,135

UNITED STATES PATENT OFFICE 2,327,135

FREIGHT TRANSFER MECHANISM

Rumsey W. Scott, Fairfield, Conn.

Application November 4, 1941, Serial No. 417,770

9 Claims. (Cl. 214—65)

This invention relates to improvements in freight transfer mechanism, and especially to mechanisms which are mounted upon a vehicle for moving loads from the vehicle to another vehicle or platform or to the vehicle from another vehicle or platform. My invention relates to that type of such mechanisms as are arranged to move loads laterally to or from either side of the vehicle to which it is applied. It is necessary, when such arrangements are applied to road vehicles or railway cars, that it does not extend beyond the overall width of the vehicle when not in use, although it should be capable of imparting to the transferred load a movement in excess of such width.

One of the objects of my invention is to provide a simple and inexpensive organism which meets these requirements. In many cases, such for example as when a transfer mechanism of the type to which this invention pertains, is applied to certain kinds of vehicles, such as trailers, the longitudinal space available is limited, and another object of my invention is to provide a simple mechanism which will be confined within such limited longitudinal space.

A still further object of my invention is to provide a simple expedient for overcoming difficulties encountered in side loading because of differences of level between the platforms of the vehicles or between a vehicle and a platform.

Other objects of my invention will appear in the following specification in which I will describe an arrangement which is made according to and embodies the present invention, the novel features of which I will point out in appended claims.

Referring to the drawings,

Fig. 1 is a plan view, more or less diagrammatic, of a part of a motor trailer equipped with freight transfer mechanism which is made according to and embodies my invention, and of an adjacent load supporting platform. Parts of the transferring mechanism are shown in different relative positions in broken lines;

Fig. 2 is a side elevation of some of the parts shown in Fig. 1;

Fig. 3 is an end elevation, partly in section, of the parts shown in the preceding figures;

Fig. 4 is a view similar to Fig. 3 in which parts are shown in different relative positions, the section being taken on the line 4—4 of Fig. 1; and Fig. 5 is a plan view of some of the transfer mechanism parts of a modified arrangement.

10 designates the chassis of a truck or trailer supported on wheels 11. A frame rigidly mounted on the chassis comprises longitudinally spaced channel-like transverse guides 12 which are adapted to receive skids 13 on the lower side of a load container 14 and to slidably support the container.

15 designates a platform to or from which the container is to be transferred. This may be a stationary platform or the deck of another vehicle which may be another road vehicle or a railway car. It is provided with transverse guides 16 for receiving the skids 13. 16A designates supports for the container on brackets 16B intermediate the guides. It is to be understood that before a load transfer operation is effected, the guides 12 and 16 are brought into alinement.

When there is a space between the vehicle equipped with the transfer mechanism which I am about to describe and the platform having the guides 16, as shown in Figs. 1 and 4, bridges 17 are used. These are provided with hooks 18 which engage suitable receptacles on the trailer and their other ends rest on the platform 15. The upper surfaces of these bridges are constructed to form guides 19 between the guides 12 and 16.

The novel transfer mechanism which I have invented comprises a pair of levers 20 and 30 mounted to swing about a central pivot at 21. The ends of these levers are slotted, as at 22, 32, so that they may slide longitudinally on the pivot. Lever 30 is offset, as at 31, so that its outer end is at substantially the same level as that of lever 20.

23, 33 are sprocket chains which run around sprocket wheels 24, 34 and guide sheaves 25, 26 and 35, 36, respectively mounted in frames 27 and 37. The guide sheave 25 is in transverse alinement with the sprocket wheel 24 and the sheave 26 which is substantially midway between them is offset toward the pivot 21. The sheaves 35 and 36 are similarly positioned in relation to the sprocket wheel 34. The lever 20 is connected at 28 with one of the links of the chain 23. The lever 30 is connected at 38 with one of the links of chain 33.

Sprocket wheel 24 is affixed to a vertical shaft on which is a pinion 29. Sprocket wheel 34 is affixed to a vertical shaft on which is a pinion 39.

40 and 50 are cylinders within which are pistons arranged to actuate racks 41, 51 which engage the pinions 29, 39, respectively. 60 is a pump for drawing oil from a tank 61 through a pipe 62, forcing it under pressure through a safety release device 63 and a pipe 64 to a pair of valves 65 and 75 from which levers 66 and 76 extend. Between these valves is a control lever 70 connected with the levers 66 and 76 by connecting rods 71 and 72 for simultaneous actuation of the valves. Either one of these rods may be disconnected from its respective valve lever, as shown at 72A, for individual actuation of the valves.

When the control lever is moved downwardly ports in valve 65 will connect the pressure pipe 64 with a pipe 42 which leads to the left hand end of cylinder 40 and at the same time will connect a pipe 43 from the right hand end of cylinder 40 with a return pipe 67 from valve 65 to tank 61. This will cause the rack 41 to be moved to the right to rotate pinion 29 and sprocket wheel 24 in a clockwise direction.

If the valve 75 is rotated in the same direction at the same time, its ports will connect the pressure line 64 with a pipe 52 which leads to the right hand end of tank 50 and the outlet pipe 67 with a pipe 53 from the right hand end of tank 50. This will cause rack 51 to move to the right to rotate pinion 39 and sprocket wheel 34 in an anti-clockwise direction.

If valves 65 and 75 are moved in the opposite direction from that described, pressure will be admitted through pipes 43 and 53 to the right hand ends of cylinders 40 and 50 and oil will flow from the left hand ends of these cylinders through pipes 42, 52, valves 65, 75 and pipe 67 to tank 61. This, of course, will result in the rotation of sprocket wheel 24 in an anticlockwise direction and the rotation of sprocket wheel 34 in a clockwise direction.

If the levers 20 and 30 are in the positions in which they are shown in full lines in Fig. 1 and valves 65, 75 are turned in a clockwise direction, the points of connection 28, 38 between the levers and the chains 23, 33 will be moved toward the center of the vehicle and toward each other. When the points of connection reach the longitudinal center of the vehicle in the positions shown at 28A and 38A in Fig. 1, they have swung the levers into alinement and have drawn them into the positions indicated at 20A and 30A. The result is that the ends of the levers move in substantially straight lines transverse to the longitudinal axis of the vehicle.

Auxiliary members 80 and 90 are connected by vertical pivots 81, 91 to the levers 20 and 30 near their outer ends and arms 82, 92 are connected to these members by horizontal pivots 83, 93. The outer ends of the arms 82, 92 are shaped to form hooks to engage pins 17A on the containers 14 in line with the guides 12 and 16, for either pushing or pulling the containers from or to the vehicle, (see Fig. 4).

When the vehicle is being drawn along a highway the levers 20, 30 are retracted until their outer ends are within the overall width of the vehicle, in this case represented by the length of the guides 12. After the vehicle has been pulled up alongside of the platform 15 and its guides 12 alined with the guides 16, the levers 20, 30 are moved out into the position in which they are shown in broken lines at 20B and 30B in Fig. 1. Then the members 82, 92 are engaged with the pins 17 on the container. Then the levers 20, 30 are actuated by the mechanism which has been described. The container 14 will be pushed thereby onto the platform 15. The levers are capable of moving as far as the positions in which they are shown in full lines in Fig. 1, which is enough to move the container beyond the edge of the platform.

When the guides 12 and 16 are at different levels, as shown in Fig. 4, the arms 80, 90 will swing about their horizontal pivots 81, 91 as the container moves from the vehicle to the platform and thus compensate for this difference of level.

It is obvious that the operation thus described may be performed from either side of the vehicle and that it may be reversed to pull a container from a platform onto the vehicle.

In the arrangement shown in Fig. 1 either of the levers 20, 30 may be moved without moving the other and if occasion requires they may be moved in opposite directions.

In the modification shown in Fig. 5 a single actuating cylinder 40A is shown arranged to actuate two racks 41A, 51A simultaneously. These racks actuate pinions 29A, 39A and sprocket wheels 24A, 34A simultaneously in opposite directions to drive the chains 23A, 33A in a manner similar to that which has been described.

The mechanisms shown and described herein are merely for illustrative purposes and many structural modifications may be made within the scope and spirit of the invention. I intend no limitations other than those imposed by the following claims:

1. A vehicle load transfer mechanism comprising a pair of levers slidably mounted on fulcrums near the transverse center of the vehicle, and mechanism for swinging the levers simultaneously in opposite directions across the vehicle, the free ends of said levers moving through a path longer than the width of the vehicle in a substantially common plane in substantially rectilinear lines normal to the longitudinal axis of the vehicle.

2. In a vehicle load transfer mechanism, a lever, a fulcrum for the lever near the transverse center of the vehicle, said lever being slotted to slide on the fulcrum, an endless driving chain across the vehicle having one of its runs guided to move in paths oppositely oblique to a line normal to the longitudinal axis of the vehicle, and a connection between the lever and the obliquely movable part of the chain.

3. In a vehicle load transfer mechanism, a pair of oppositely disposed levers, a fulcrum for the levers near the transverse center of the vehicle, said levers being slotted to slide on the fulcrum, a pair of endless driving chains across the vehicle, each having one of its runs guided to move in paths oppositely oblique to a line normal to the longitudinal axis of the vehicle, and a connection between each lever and the obliquely movable part of one of the chains.

4. In a vehicle load transfer mechanism, a pair of oppositely disposed levers, a fulcrum for the levers near the transverse center of the vehicle, said levers being slotted to slide on the fulcrum, a pair of endless chains across the vehicle, each having one of its runs guided to move in paths oppositely oblique to a line normal to the longitudinal axis of the vehicle, a connection between each lever and the obliquely movable part of one of the chains, and fluid pressure means for driving the chains.

5. In a vehicle load transfer mechanism, a pair of oppositely disposed levers, a fulcrum for the levers near the transverse center of the vehicle, said levers being slotted to slide on the fulcrum, a pair of endless chains across the vehicle, each having one of its runs guided to move in paths oppositely oblique to a line normal to the longitudinal axis of the vehicle, a connection between each lever and the obliquely movable part of one of the chains, fluid pressure means for driving the chains, an independent control valve for each of said driving means, and means for operating both of said valves together.

6. A vehicle load transfer mechanism comprising a pair of levers slidably mounted on fulcrums near the transverse center of the vehicle, mechanism for swinging the levers simultaneously in opposite directions across the vehicle, the free ends of said levers moving through a path longer than the width of the vehicle in a substantially common plane in substantially rectilinear lines normal to the longitudinal axis of the vehicle and auxiliary members horizontally pivoted to the levers near the free ends thereof.

7. A vehicle load mechanism comprising a pair of levers, fulcrums for the levers near the longitudinal center of the vehicle, said levers being slidably mounted on the fulcrums, mechanism for imparting to the levers a longitudinal movement relative to the fulcrums and swinging the levers simultaneously in opposite directions across the vehicle, the free ends of the levers moving through a path longer than the width of the vehicle in a substantially common plane in substantially rectilinear lines normal to the longitudinal axis of the vehicle.

8. A vehicle load transfer mechanism comprising a pair of levers slidably mounted on fulcrums near the transverse center of the vehicle, mechanism engaging the levers at points intermediate the ends of the levers for swinging the levers simultaneously in opposite directions across the vehicle, the free ends of the levers moving through a path longer than the width of the vehicle in a substantially common plane, and means for guiding said points of engagement out of straight paths to cause the free ends of the levers to move in a substantially common plane in substantially rectilinear lines normal to the longitudinal axis of the vehicle.

9. A vehicle load transfer mechanism comprising a pair of levers slidably mounted on fulcrums near the transverse center of the vehicle, fluid pressure actuated means connected with each of the levers for swinging the levers, an independent control valve for each of said fluid pressure actuated means, and means for selectively operating either of said valves independently or moving both of the valves together to swing the levers simultaneously in opposite directions across the vehicle, the free ends of said levers moving through a path longer than the width of the vehicle in a substantially common plane in substantially rectilinear lines normal to the longitudinal axis of the vehicle.

RUMSEY W. SCOTT.